Nov. 25, 1952  O. C. HINES  2,619,141
PORTABLE DEVICE FOR CUTTING ENDS OF EARS OF CORN
Filed March 30, 1950  3 Sheets-Sheet 1
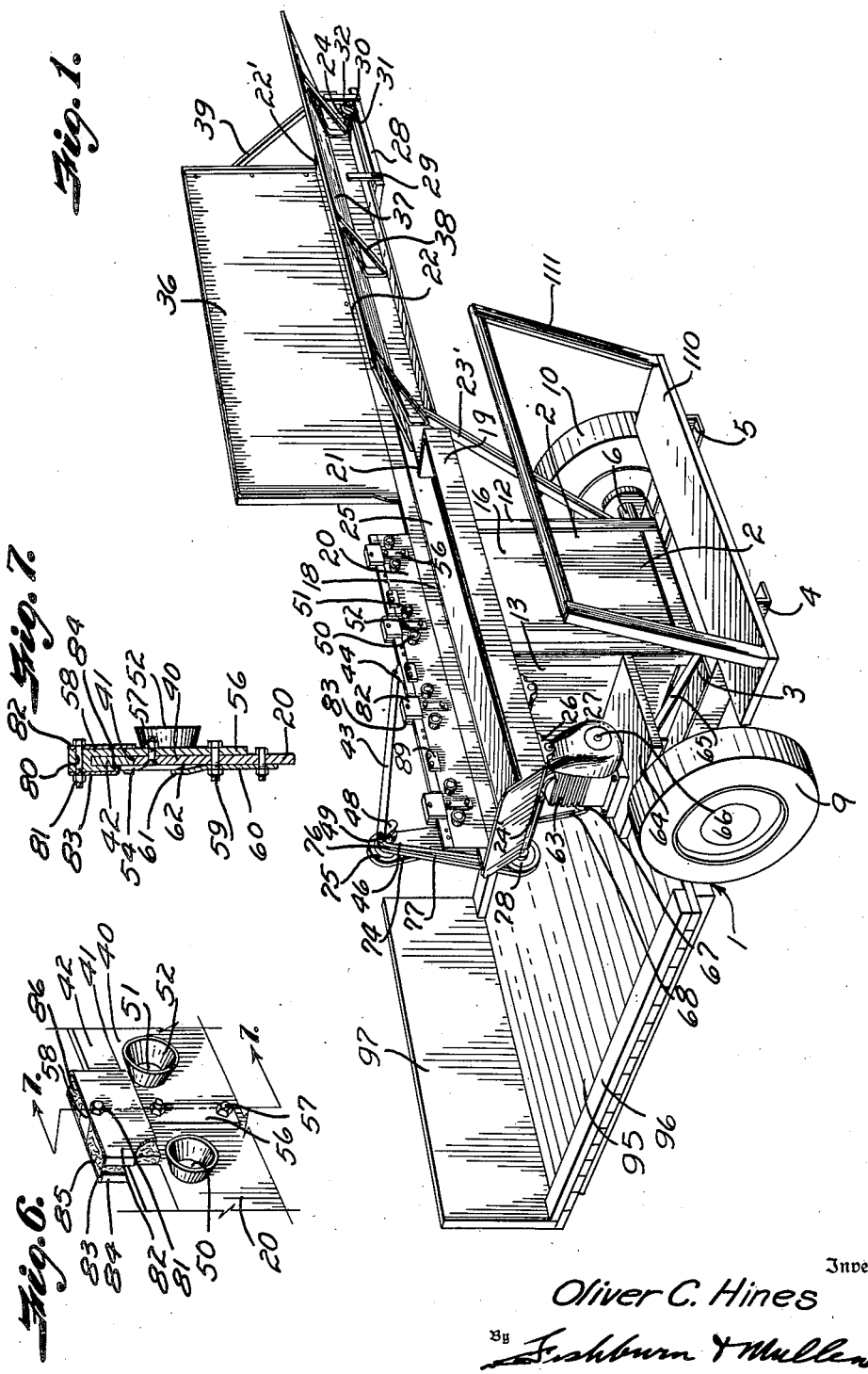
Inventor
Oliver C. Hines
By Fishburn & Mullendore
Attorneys

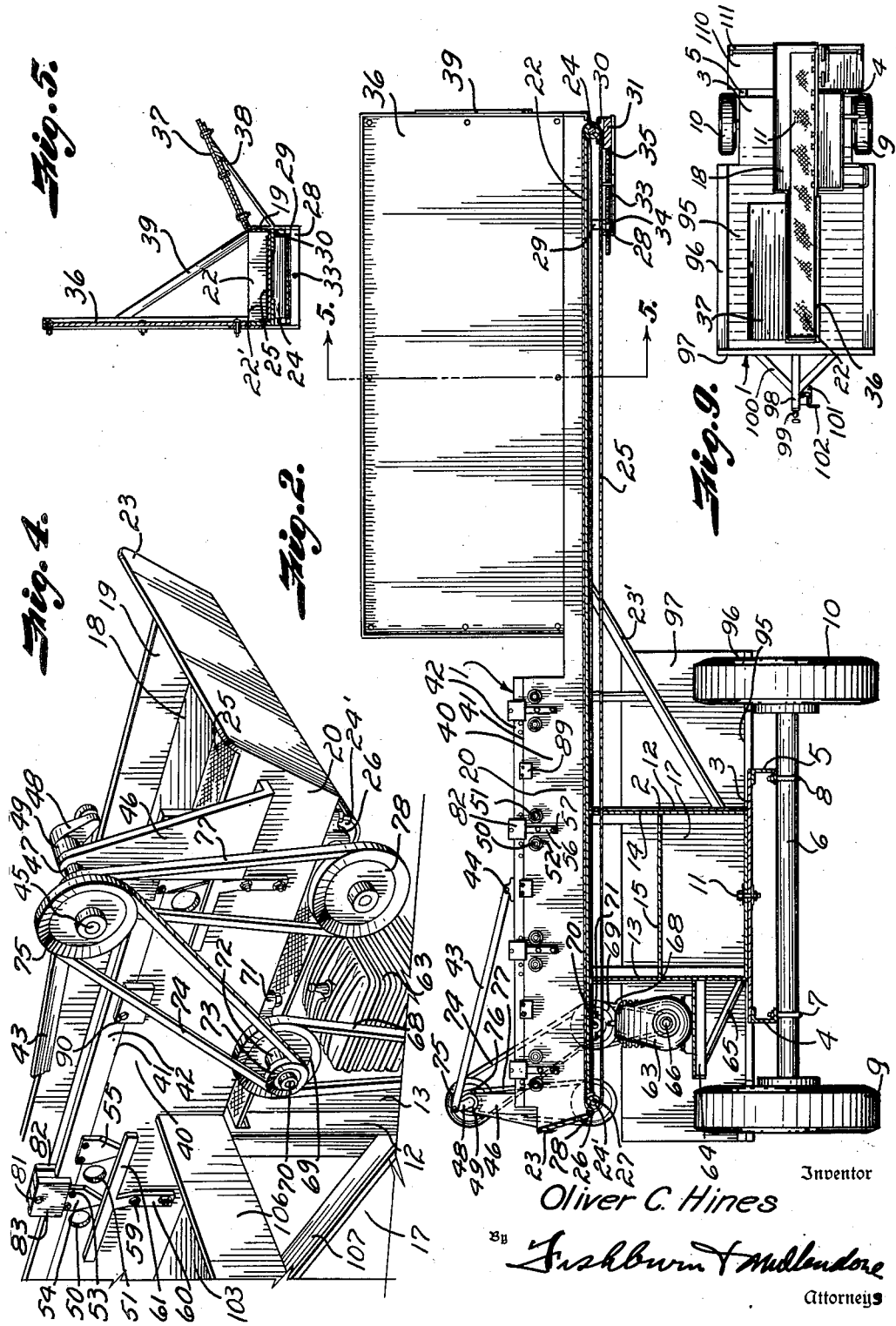

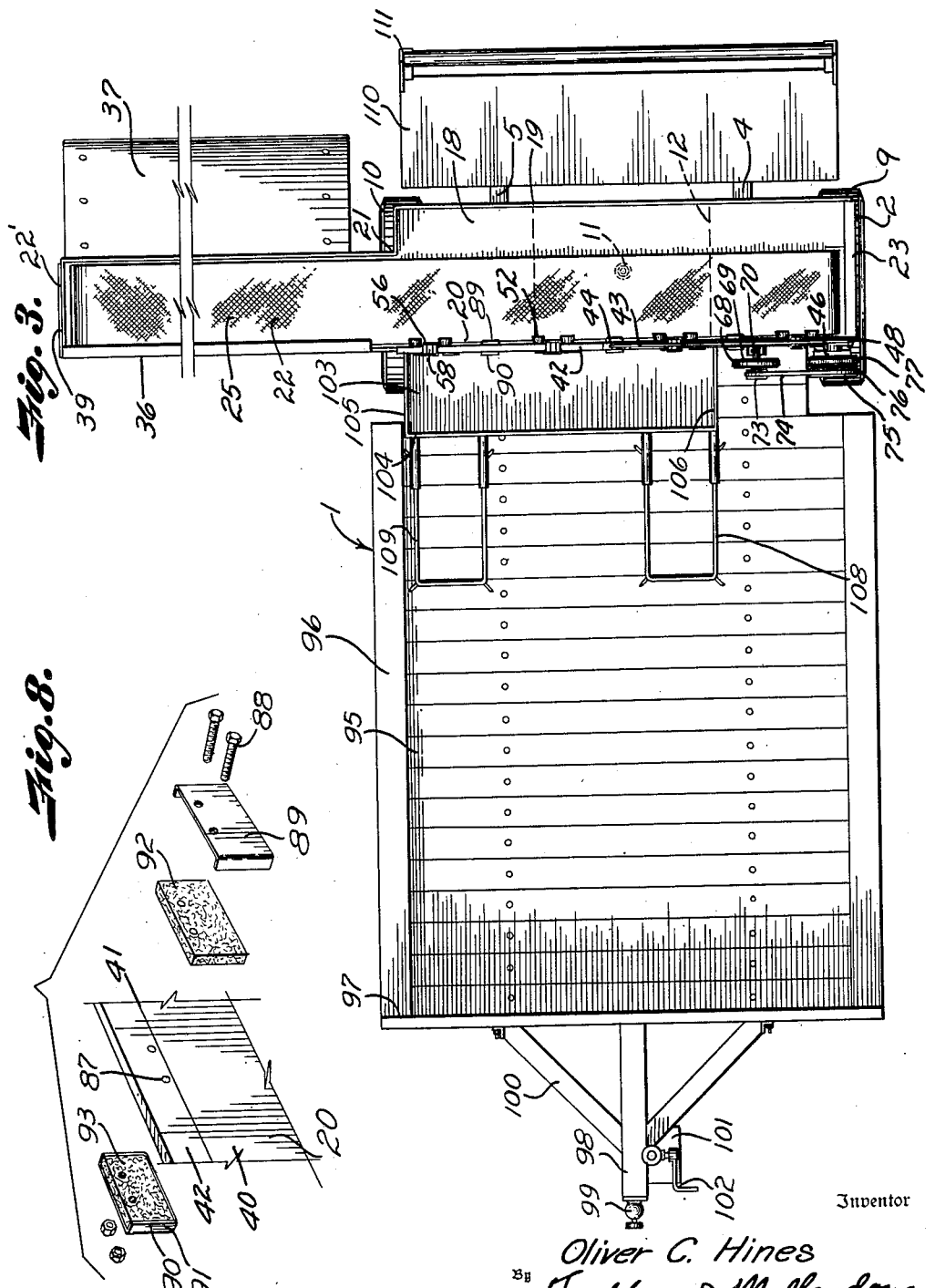

Patented Nov. 25, 1952

2,619,141

UNITED STATES PATENT OFFICE 2,619,141

PORTABLE DEVICE FOR CUTTING ENDS OF EARS OF CORN

Oliver C. Hines, Kansas City, Kans.

Application March 30, 1950, Serial No. 152,931

1 Claim. (Cl. 146—84)

This invention relates to a portable corn trimming device, and more particularly to a device for cutting the ends from the ears of corn with the husks thereon as the device is moved through the field.

The device is particularly adaptable for preparing ears of corn, particularly sweet corn, for shipment as the device is propelled through the field of corn. The device is propelled through the field and the ears of corn are pulled from the stock, thrown into a hopper on the device, the stem on the butt end of the ear inserted in the cutter mechanism of the device, as well as the tip or silk end of the ear for preparing the corn for market.

The principal objects of the present invention are to provide a device for cutting both the butt and silk ends off the ears of corn so that the husks will remain thereon to maintain the corn in fresh condition as the device is moved along the corn field; to provide means for clipping the ends of the ears of corn; to provide sacking means for the ears of corn after the ends have been clipped; to provide an endless belt from the hopper along side of the cutting mechanism to carry the corn from the hopper to the work table; to provide a platform ahead of the cutting mechanism for sacking of the corn and storing a limited quantity thereon as the device is propelled through the field; to provide means for propelling the device from a source of power such as a tractor or other vehicle, to provide oiling means for the reciprocating cutting mechanism; to provide means for operating the endless belt and cutting mechanism; and to provide a device of this character simple, economical to manufacture, and efficient in operation.

In accomplishing these and other objects of the invention, I have provided improved details of the structure, the preferred forms of which are shown in the accompanying drawings, wherein:

Fig. 1 is a perspective view of my invention.

Fig. 2 is a longitudinal cross section through the hopper, particularly illustrating the conveyor mechanism.

Fig. 3 is a top plan view of the device.

Fig. 4 is a perspective view particularly illustrating the driving mechanism for the cutter mechanism.

Fig. 5 is a cross sectional view through the hopper, line 5—5 of Fig. 2.

Fig. 6 is an elevational view of a part of the cutter mechanism particularly illustrating the opening for the ear of corn and the oiling mechanism for the reciprocating cutter bar.

Fig. 7 is a cross sectional view through the cutting and oiler mechanism, on line 7—7 of Fig. 6.

Fig. 8 is a perspective view of the oiling mechanism for the reciprocating bar shown in disassembled relation.

Fig. 9 is a reduced plan view of the device with the hopper and worktable shown pivoted and in alignment with the platform of the vehicle.

Referring more in detail to the drawing:

1 designates a portable corn trimming device embodying the features of my invention comprising a frame structure 2 rotatably mounted on a plate 3, mounted on U-shaped rails 4 and 5 secured to an axle housing 6 by U-bolts 7 and 8. The plate 3 is secured to the flanges of the rails supported on wheels 9 and 10, by welding or other suitable means and the frame 2 is rotatably mounted on the plate by a bolt or the like 11. The frame includes a housing 12 consisting of sides 13 and 14, a shelf 15 and back 16 and open front 17.

Suitably mounted upon the housing 12 is a worktable 18 having a front side 19 and rear side 20 offset inwardly as indicated at 21 and the sides 13 and 19 extend outwardly from the worktable forming a hopper 22 having an end 22' for receiving the ears of corn as they are gathered from the field. The outer end of the worktable has an inclined portion 23. The hopper is supported on the frame 2 by a bracing structure as indicated at 23' (Fig. 2). The outer ends of the hopper 22 and the worktable 18 are provided with openings for receiving rollers 24 and 24' over which an endless belt 25 runs, forming the bottom for the worktable and for the hopper. The roller 24' is secured to the underneath sides of the worktable near the outer end thereof by a bracket 26 forming a bearing for a shaft 27. Spaced from the outer end of the hopper is a bracket 28 having upwardly extending arm 29 secured to the sides thereof in any suitable manner, the bracket forming a keeper for the endless belt as it runs thereover. The roller 24 is mounted near the outer end of the hopper by movable brackets 30, the brackets being mounted on a cross piece 31 secured to the sides of the hopper by arms 32 as best illustrated in Fig. 1. Tension of the endless belt is provided by a threaded bolt 33 extending through an opening in the bracket 28 and provided with a nut 34, the inner end of the bolt engaging against the cross piece 31 as indicated at 35 (Fig. 5), as is the usual practice.

The hopper 22 is provided with a vertical backboard 36 and an inclined frontboard 37 held in place by a plurality of brackets 38, to provide easy access of the ears of corn to the hopper when thrown by the pickers. A brace 39 is secured to the backboard 36 and the outer end of the hopper to lend rigidity to the structure.

Mounted on the back side of the side 20 of the worktable is a plate or wall 40 preferably made of metal and having a flat top surface as indicated at 41 (Fig. 7). A bar 42 is mounted for reciprocation on the flat bearing surface 41 of the plate member 40 and is adapted to be reciprocated thereon by a pitman 43 having connection therewith as indicated at 44 and eccentrically connected to a shaft 45 mounted upon a bracket 46 secured to the back side 20 of the worktable in any suitable manner as by welding or the like, as best illustrated in Fig. 4. The upper end of the bracket is provided with a bore opening 47 forming a bearing for the shaft 45. The pitman is eccentrically mounted to the shaft 45 by an arm 48. A bushing 49 is provided between the arm and the upper end of the bracket 46. The wall 40 is provided with pairs of spaced openings 50 and 51 and rigidly mounted with the openings are cone shaped receptacles 52 to which the ends of the ears of corn are to be inserted for clipping the ends thereof.

Mounted on the reciprocating bar 42 by bolt, rivets or the like 53 are spaced cutters 54 and 55, the cutters being situated adjacent to the openings 50 and 51 on the plate 40 so that when the bar is reciprocated the cutters will pass over the openings for severing the ends of corn as later will be described. A plurality of spaced brackets or guides 56 are rigidly secured to the inside of plate 40 by rivets or the like 57 and have their upper ends turned over forming a U-shaped portion 58 to retain the reciprocating bar 42 on the plate member.

Mounted on the outside of the plate 40 adjacent the openings 50 and 51 by bolts or the like 59 are spaced brackets 60 having a cross arm 61 on the upper end and spaced from the plate 40 a distance substantially equal to the width of the cutters 54 and 55, as best illustrated at 62 (Fig. 7) for retaining the cutters substantially adjacent the outside of the plate 40.

A motor 63 is mounted on a shelf 64 secured to the side 14 of the housing 12 and supported by a brace 65. The motor has the usual shaft 66 provided with a pulley 67 adapted to receive a belt 68 running to a pulley 69 mounted on a shaft 70 secured to the underneath side of the worktable by brackets or the like 71. A bushing 72 is provided on the shaft 70 adjacent the pulley 69 and mounted on the outer end of the shaft 70 is a pulley 73 adapted to receive a belt 74 running over a pulley 75 mounted on the shaft 45 to reciprocate the bar 42 by the eccentric crank arm 48 and pitman 43. Mounted on the shaft 45 inside the pulley 75 is a pulley 76 adapted to receive a belt 77 running to a pulley 78 mounted on the roller shaft 24 over which runs the endless belt 25 for operating said belt when the motor is operating.

In order to provide lubrication for the reciprocating cutting bar, each of the brackets 56 with their U-shaped upper ends 58 are provided with openings 80 near their upper ends adapted to receive bolts 81 extending through plates 82 and 83 having their respective ends turned inwardly facing each other as indicated at 84 (Fig. 6) for receiving pads 85 and 86 of felt or other absorbent material adapted to contain a lubricant. The plate 83 is slightly shorter than the plate 82 so as to avoid the cutting knives 54 and 55 on the rear side of the reciprocating bar.

The cutter bar 42 is provided with spaced openings 87 adapted to receive bolts 88 for mounting plates 89 and 90 on the respective sides of the reciprocating blade 42 and back plate 40 of the worktable substantially midway between the cone shaped receptacles 52. The plates 89 and 90 have their ends turned inwardly as indicated at 91 and adapted to be retained by the plates are pads 92 and 93 of a felt or other absorbent material adapted to contain a lubricant for lubricating the plate 40 as the reciprocating bar 42 moves thereover.

A forwardly extending platform 95 is mounted on the longitudinal rails 4 and 5 providing a packing and storing space for the corn after the ends have been clipped. The platform has side rails 96 and a front end 97 against which the corn may be stacked. Secured to the front end of the platform is a shaft 98 having end 99 for connection of the device to a tractor or the like for moving the same through the field, the connection being provided with braces 100 and a jack stand 101 having a crank 102 is provided for supporting the front end of the platform when not in use.

The platform is substantially the same width as the worktable and located to the side of the motor and driving mechanism is a bin 103 having a front side 104, and ends 105 and 106 upon which the ears of corn are deposited after the ends have been clipped. Braces 107 are provided for the bin as illustrated in Fig. 4. Brackets 108 and 109 are provided forwardly of and at the respective ends of the bin 104 adapted to hold sacks (not shown) into which the corn may be placed ready for shipment.

The rails 4 and 5 extend rearwardly of the framework structure and wheels of the device and mounted on the rear ends of the rails is a platform 110 having an upwardly extending rear-framework 111, the platform being provided for supporting the workers inserting the ends of the ears of corn from the worktable in the cutter openings for trimming the ends therefrom.

In operation of a device constructed and assembled as described the device is propelled through the field by a tractor (not shown), workers gather the corn from the stalks in the field and throw or deposit it into the hopper 22 where the endless belt 25 carries it to the worktable 18. Other workers standing on the platform 110 pick up the ears and insert the respective ends thereof in the cone shaped members 52 surrounding the openings in the back side of the worktable and the reciprocating cutter operated by the motor 63 clips the ends from the ears, after which they are deposited by the workers in the bin 103. Other workers on the platform 95 pick up the ears from the bin and deposit them in the sacks held by the brackets 108 and 109. When the sacks are filled they are placed to the front of the platform 95 until the device is transported to a place of deposit of the sacks. The empty sacks may be stored on shelf 15 of housing 12 for convenient access of the sackers through open side 17 of said housing.

The ends of the ears of corn that have been clipped also are deposited in the bin 103 where they may be disposed of as it becomes necessary. If desired openings in the bottom of the bin may be provided for disposing of the ends of the ears as the machine is propelled through the field. Also, while I have not illustrated the same, a suitable guard may be placed over the cutters on the reciprocating bar.

Fig. 9 illustrates the device with the hopper and worktable pivoted and positioned in longitudinal alignment with the frame and platform of the vehicle for transporting from place to place and for movement through narrow confines such as gates or the like. In order to rotate the framework structure and hopper on the plate 3 and rails 4 and 5 the bolt 11 is loosened so that the frame 2 will rotate on the plate 3 until the hopper is extended over the platform 95 of the device when the bolt may again be tightened to hold the hopper and frame or structure in that position. When the device is desired for use in the field the bolt 11 may again be loosened and the hopper extended laterally of the device and the bolt tightened to hold it in place.

It will be obvious from the foregoing that I have provided an improved corn trimming device which may be propelled through the field and the ears of corn trimmed as the device is moved along.

This application is directed to an improvement over my prior filed application Serial Number 85,821 filed April 6, 1949, wherein the cutting device is claimed per se.

What I claim and desire to secure by Letters Patent is:

In a device of the character described, a plate member having an upper edge forming a track and having a pair of openings spaced below the track to provide annular cutting edges at one side of the plate member, a bar mounted on the track for reciprocatory movement, cutters projecting downwardly from the bar alongside said plate, a guide bracket fixed to the plate member intermediate said openings and having a U-shaped hook portion engaging over the bar to retain the bar in contact with the track, a bracket on the side of the openings opposite said guide bracket and having an elongated guide portion extending parallel with the bar in overlapping relation with the cutters to cooperate with the bar retaining bracket in supporting the cutters in shearing relation with the cutting edges of the openings, said cutter bar having spaced openings above the pair of spaced openings in the plate member, plates having inturned ends on the respective sides of the cutter bar having openings therein, lubricating pads engaging in said plates having openings aligning with the openings in the cutter bar and plates, and bolts engaging in said openings in the bar, plates and pads for retaining said parts together and lubricating the cutter bar.

OLIVER C. HINES.

REFERENCES CITED

The following references are of record in the file of this patent:

UNITED STATES PATENTS

| Number | Name | Date |
| --- | --- | --- |
| 2,169,521 | Chong | Aug. 15, 1939 |
| 2,481,947 | Philkoff | Sept. 13, 1949 |